United States Patent
Rossmanith

(10) Patent No.: US 6,478,963 B1
(45) Date of Patent: Nov. 12, 2002

(54) METHOD AND DEVICE FOR ANAEROBIC PURIFICATION OF WASTE WATER USING THE UASB METHOD

(75) Inventor: Peter Rossmanith, Rielasingen (DE)

(73) Assignee: USF Deuthschland GmbH Gutling, Rielasingen (DE)

( * ) Notice: Subject to any disclaimer, the term of this patent is extended or adjusted under 35 U.S.C. 154(b) by 0 days.

(21) Appl. No.: 09/647,944

(22) PCT Filed: Apr. 6, 1999

(86) PCT No.: PCT/EP99/02325

§ 371 (c)(1),
(2), (4) Date: Dec. 27, 2000

(87) PCT Pub. No.: WO99/51532

PCT Pub. Date: Oct. 14, 1999

(30) Foreign Application Priority Data

Apr. 7, 1998 (DE) .......................................... 198 15 616

(51) Int. Cl.⁷ .................................................. C02F 3/28
(52) U.S. Cl. ...................... 210/603; 210/605; 210/188; 210/195.3; 210/197
(58) Field of Search ................................ 210/188, 194, 210/195.1, 195.3, 197, 218, 603, 604, 605, 629

(56) References Cited

U.S. PATENT DOCUMENTS

| 2,638,444 A | * | 5/1953 | Kappe | .......................... 210/603 |
| 3,242,071 A | * | 3/1966 | Walker | ........................ 210/603 |
| 4,009,098 A | * | 2/1977 | Jeris | .............................. 210/604 |
| 4,253,956 A | * | 3/1981 | Pette | ........................... 210/188 |
| 4,482,458 A | * | 11/1984 | Rovel et al. | ................. 210/603 |
| 4,758,339 A | * | 7/1988 | Vellinga | ..................... 210/188 |
| 5,298,163 A | * | 3/1994 | Ehlinger | ..................... 210/603 |
| 5,338,445 A | * | 8/1994 | Zumbragel et al. | ......... 210/603 |
| 5,441,634 A | | 8/1995 | Edwards | ..................... 210/194 |
| 5,500,118 A | * | 3/1996 | Coenen et al. | .............. 210/188 |

FOREIGN PATENT DOCUMENTS

| EP | 0 170 332 A1 | 2/1986 | ............. C02F/3/28 |
| EP | 0 342 722 A1 | 11/1989 | ............. C02F/3/28 |
| JP | 60220194 | 11/1985 | ............. C02F/3/28 |
| WO | WO 93/24417 | 12/1993 | ............. C02F/3/28 |
| WO | WO 96/23735 | 8/1996 | ............. C02F/3/30 |

OTHER PUBLICATIONS

PCT International Search Report issued on Sep. 3, 1999, for application No. PCT/EP99/02325.

* cited by examiner

*Primary Examiner*—Christopher Upton
(74) *Attorney, Agent, or Firm*—Moser, Patterson & Sheridan, L.L.P.

(57) ABSTRACT

Described is a method and a device for purifying waste water, in particular by means of anaerobic purification. The method is carried out in a waste water- and sludge-receiving container under generation of gas, the developing gas being trapped by a gas collector and the circulation formed by the ascending gas being used for loosening the sludge which has settled on the bottom of the container. Such a method is to be developed in a constructionally simple and more efficient way. To this end the settled sludge should be sucked from the bottom by a gas lifting effect provided by the ascending gas, and should be passed into the upper portion of the container in a condition separated from the waster water in the container, and returned into the waste water.

17 Claims, 1 Drawing Sheet

METHOD AND DEVICE FOR ANAEROBIC PURIFICATION OF WASTE WATER USING THE UASB METHOD

BACKGROUND OF THE INVENTION

The present invention relates to a method and a device for purifying waste water.

Such a method and such a device are known from EP 0 170 332 B1. The known device operates in an anaerobic way, preferably according to the known UASB method (upflow anaerobic sludge blanket), in which a container is used into the lower portion of which the waste water to be purified is passed and from the upper portion of which the purified waste water is discharged. Anaerobic microorganisms are active in the container. Disposed between the waste water inlet and the overflow pipe for the purified waste water are gas collectors which are arranged in superimposed fashion in the container in the form of hoods whose upper portion is connected via a pipe to a gas-sludge separating means. Gas is produced by the action of microorganisms and gets attached to the sludge in such a way that said sludge floats upwards as so-called buoyant sludge. Said buoyant sludge is trapped by the hood, thereby gradually releasing its gas, so that it becomes heavier again and settles again on the bottom as so-called settled sludge. The gas released from the pellets further rises upwards in the pipes together with the free gas bubbles trapped by the hoods, thereby entraining buoyant sludge particles and liquid which are separated in the gas-sludge separating chamber. The gas is expediently discharged while the entrained liquid, which may also contain sludge particles, passes into a downpipe leading back to the bottom of the container. The sludge which has settled on the bottom is thereby to be whirled, which is to loosen the sludge zone in the bottom portion and effect an improved thorough mixing of the microorganisms with the inflowing waste water. However, since water is relatively heavy, the amount of the waste water which can be transported by the buoyant gas and thus the whirling efficiency of the returned waste water are limited. Furthermore, it is known that waste water reactors of this type must have reactor heights of at least 11 m before the said effect can be observed.

SUMMARY OF THE INVENTION

It is therefore the object of the present invention to provide a method and a device for purifying waste water, whereby an effective whirling and thorough mixing of the settled sludge. can be achieved in a constructionally simple way.

According to the inventive design, and in contrast to the prior art, the settled sludge is no longer indirectly moved by impinging, returned water, but directly by being sucked into a rising pipe. This results in a considerably more effective flow which in particular extends over substantially the whole settled sludge zone and which ensures that there are nowhere any dead volumes where the microorganisms cannot find nutrition, or that none of the so-called short-circuit flows is formed in the case of which waste water is moved too rapidly through the sludge bed and insufficiently purified. As a result, the waste water reactors may be of a considerably smaller structural size having the same efficiency. Nevertheless, the turbulence created inside the settled sludge zone cannot become so great that sludge pellets are destroyed by excessively great shear forces because a whirling effect is still achieved by the lifting action of the gas produced in the waste water itself. Furthermore, in the case of high reactors the upper reactor chamber may show a higher density of pelletized sludge, whereby the efficiency is enhanced once more. Furthermore, in particular in the case of protein- or starch-containing waste waters forming so-called buoyant coagulates, the latter can also be returned into the bottom portion.

The efficiency is further enhanced because the lifting capacity of the gas can exclusively be exploited with this measure for lifting the settled sludge.

Expediently, the settled sludge is returned into an area below the gas collector back into the container.

Additional sludge can be entrained. For instance, in the case of protein- or starch-containing waste waters forming the so-called buoyant coagulates, the latter can also be returned into the bottom portion.

The rising capacity can be improved and the lifting of the settled sludge can immediately be started upon activation of the container.

The design according to the invention is suited for a combined anaerobic and aerobic operation.

Normally, anaerobic decomposition processes show optimum conditions between 25° C. and 37° C. With the increased flows according to the present invention, it is possible to reduce the reaction temperature. The optimum temperature for the inventive method is thus between 10° C. and 37° C. Energy can thereby be saved considerably because the Water need no longer be heated.

BRIEF DESCRIPTION OF THE DRAWING

The FIGURE shows an embodiment of the device according to the invention.

DESCRIPTION OF THE PREFERRED EMBODIMENT

Figure 1:
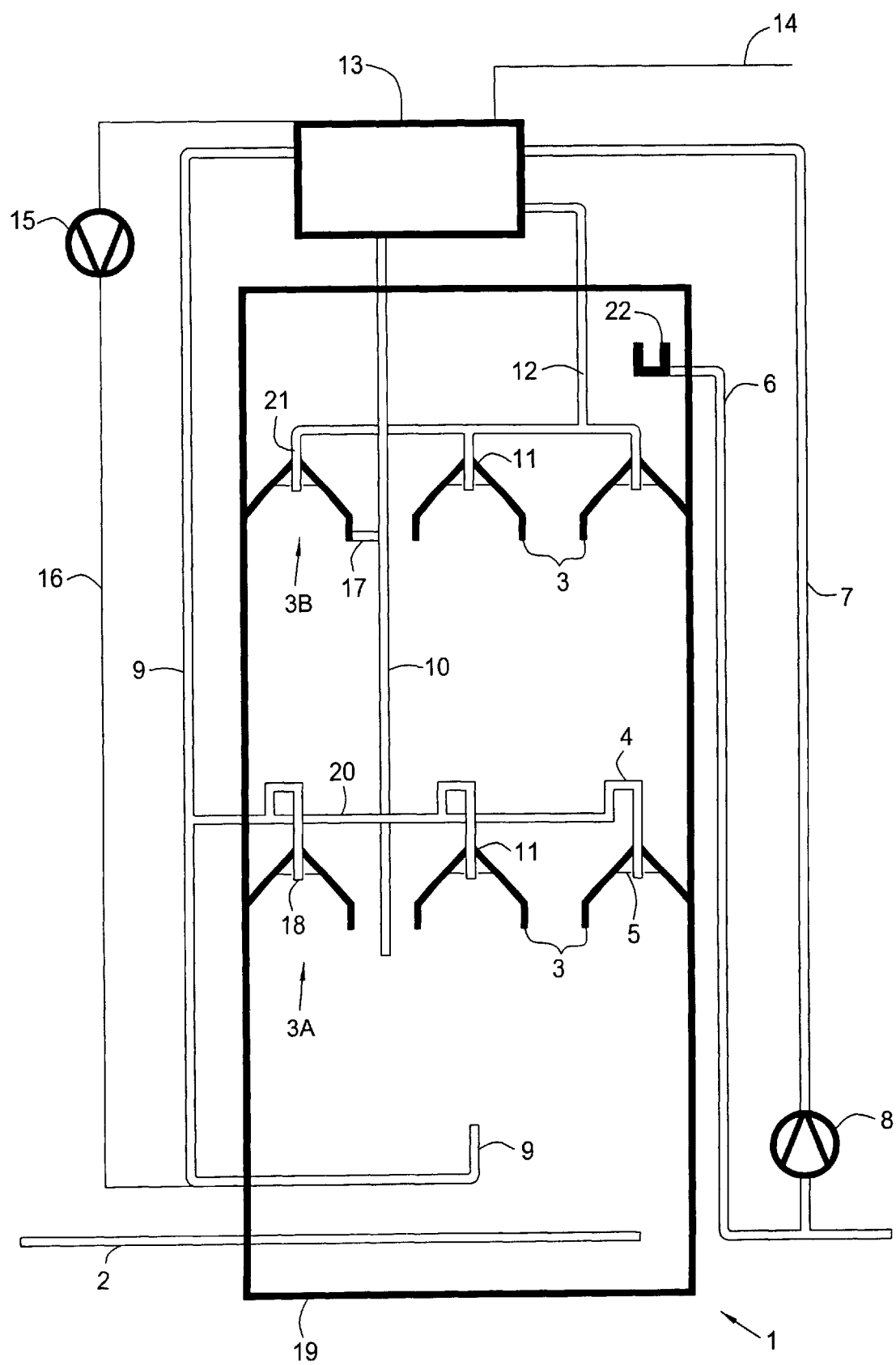

The FIGURE shows an inventive device 1 for purifying waster water according to the UASB method which predominantly operates according to the anaerobic method and is only shown schematically. The device 1 contains an upright container 19, and a waste water pipe 2 terminates in the bottom portion of said container in which a settled sludge zone mixed with microorganisms is located. The waste water pipe 2 may be equipped with one of the standard distribution systems for waste water, which, however, is not shown.

A multitude of gas collectors 3 are staggered across the height of the container 19. In the illustrated embodiment, the gas collectors 3 are grouped in two systems, i.e., a lower system 3a and an upper system 3b. Each of the gas collectors 3 is designed in the form of one of the known gas collecting hoods with a downwardly oriented opening which extends across the largest horizontal cross-section of the hood and has an upwardly tapering vertical cross-section. However, it is also possible to use other forms of gas collectors.

The gas collectors 3 of the lower system 3a comprise pipes 18 which extend through the roof ridge 11 thereof and are welded in gas-tight fashion to the ridge 11. Each of the pipes 18 extends from the roof ridge 11 a small distance, preferably 0.1 to 0.4 times the height of the gas collecting hood, downwardly into the gas collecting hood and comprises a horizontal opening or mouth optionally provided with sludge deflectors. Above the roof ridge 11, the pipes 18 have an inversely U-shaped bend 4 which is connected to a discharge pipe 20. The mouth of the inversely U-shaped bend 4 terminating in the discharge pipe 20 and the mouth of the discharge pipe 20 terminating in the rising pipe 9, respectively, is positioned a few centimeters, preferably between 5 and 10 cm, above the mouth of the pipe 18 below the roof ridge 11. The pipe 20 which is connected to all gas collectors 3 of the system 3a terminates in a rising pipe 9, i.e., a pipeline with a strongly reduced cross-section as compared to the cross-section of the container 19, the bottom mouth of said pipeline being located, preferably with an upwardly oriented mouth opening positioned in a horizontal plane, in the bottom portion of the container 19, preferably in the settled sludge zone. The rising pipe 9 extends upwards into a gas-sludge separating means 13 arranged above the container 19. A downpipe 10 extends from said gas-sludge separating means 13 back into the container 19, terminating with a downwardly oriented horizontal opening or mouth below the lower system 3a and slightly above the settled sludge zone at a distance from the mouth of the rising pipe 9.

The upper system 3b of the gas collecting hoods 3 serves in the standard manner to retain buoyant sludge so that the sludge does not pass into the purified waste water. The gas collectors 3 of the upper system 3b are also provided with pipes 21 terminating upwardly above the roof ridge 11, which, however, end without the U-shaped bend 4 of the system 3a in a discharge pipe 12 which, in turn, extends into the gas-sludge separating means 13. Below the roof ridge the pipes 21 are designed like pipes 18 of system 3a.

Some or all of the gas collectors 3 of the upper system 3b may be connected via a pipeline 17 to the downpipe 10. The pipeline 17 is located in that part of the gas collector 3 in which buoyant sludge preferably accumulates.

Above the upper system 3b, there is positioned an overflow pipe 22 for the purified water which determines the upper water level in the container 19 and terminates in a water pipe 6. A return pipe 7 which is provided with a pump 8 extends from the water pipe 6 into the gas-sludge separating means 13. A first gas pipe 14 extends from the gas-sludge separating means 13 and discharges the recovered biogas for further processing, e.g. for energy recovery. A further gas pipe 16 extends from the gas-sludge separating means 13 and has also arranged therein a pump 15. The gas pipe 16 leads into the lower portion of the rising pipe 9, so that the gas can be returned for promoting the lifting action.

The device according to the invention operates according to the following method: The waste water to be purified, e.g. organically highly contaminated waste water from the food or paper industry, passes via the waste water pipe 2 into the lower portion of the container 19 and into the settled sludge layer, preferably in the form of the usual sludge pellets, which is found there and mixed with microorganisms. The microorganisms decompose the organic contamination of the waste water, thereby producing gas. The gas will bubble upwards in the form of gas bubbles and get stuck to the sludge pellets, so that the latter become more lightweight and will floatingly rise upwards. The gas and the gas-loaded pellets which are floating upwards as buoyant sludge will pass into the region of the first system 3 and get trapped by the gas collectors 3. Gas collects in a gas cushion 5 below the roof ridge 11 and above a layer of buoyant sludge which also gradually releases its gas load, thereby settling down again as settled sludge. Gas passes via pipe 18 into the U-shaped bend 4. In said bend a gas cushion is formed which prevents buoyant sludge from ascending and from getting entrained into pipe 20. As a result, gas will only pass via pipe 20 into the rising pipe 9. In said pipe the gas produces a strongly ascending flow and thus a negative pressure at the suction opening of the rising pipe 9 in the bottom portion; said negative pressure sucks the settled sludge existing there and ensures a flow in the bottom portion which brings the sludge pellets on all sides in contact with the waste water and creates a continuous flow in the bottom portion. The mixture of gas and sucked settled sludge is separated in the gas-sludge separating means 13 where the gas is normally passed on through pipe 14 for further processing. The entrained sludge is collected, passing downwards again via the downpipe 10 into the container 19 where it is discharged below the system 3a into the container, settles again on the bottom and provides for additional turbulence at said place. While the sludge is settling down from the separating means 13 through the downpipe 10, buoyant sludge which has collected below the gas collectors 3 of the upper system 3b is sucked in via pipe 17. This enhances the whirling effect created by the returned sludge. The whirling effect can be further intensified by the settling sludge with the help of a small amount of already purified waste water which is taken by the pump 8 from the water pipe 6 and pumped via pipe 7 back into the separating means 13 where it efficiently flushes the sludge through the downpipe 10.

In particular upon activation of the device 1, the sucking operation can be supported by pumping gas, or optionally also air, into the rising pipe 9 through pipe 16 and pump 15.

The buoyant sludge and the gas bubbles that have not been trapped yet by the lower system 3a or have exited again at said place after the collecting capacity has been exceeded pass into the portion of the upper system 3b and are there trapped by gas collectors 3. The gas collecting in the ridge 11 is passed via the straight vertical pipes 21 and pipe 12 into the separating means 13 whereas the buoyant sludge layer is either discharged via pipe 17 or, after discharge of the gas, settles again on the bottom. The purified waste water flows into the overflow pipe 22, passing from there into the water pipe 6.

If necessary, the device of the invention can also additionally be operated aerobically, with oxygen being added in an amount of 1 to 3% by volume into the gas-sludge separating means 13 to achieve, e.g., a biological oxidation of the sulfur contained in the gas. There is no return of the gas via pump 15 and pipe 16.

In a modification of the above described and drawn embodiment, more than two gas collecting systems maybe provided or the containers may only contain gas collectors of the lower gas collecting system, provided these are able to keep buoyant sludge away from the overflow pipe for purified water. In the case of very small reactor heights, the pump may be operated continuously for returning gas into the rising pipe. The rising pipe may extend in the interior of the container, and the downpipe outside the container. It is also possible to pass the settled sludge via a branch from the rising pipe directly into the container and not into the separating means. When it is ensured that gas solely or predominantly passes into the rising pipe, the gas collectors may be devoid of the U-shaped bend or may be equipped with another gas separating means or may be connected to a gas-separating means arranged upstream of the rising pipe.

What is claimed is:
1. A method for purifying waste water, comprising:
introducing waste water into a container having a layer settled sludge at the bottom of the container;
mixing the waste water with microorganisms which generate gas;
collecting the gas in a gas collector connected to a rinsing pipe having an opening located in the layer of settled sludge;

sucking the settled sludge into the rising pipe using suction created by ascending gas and then passing the settled sludge into the upper portion of the container in a condition separated from the waste water in the container; and returning the settled sludge into the waste water.

2. The method of claim 1, further comprising separating the ascending gas from the settled sludge.

3. The method of claim 2, wherein, after the ascending gas is separated from the settled sludge, the settled sludge is returned into the waste water below the gas collector.

4. The method of claim 1, wherein the settled sludge is returned into the waste water below the gas collector.

5. The method of claim 1, further comprising introducing additional gas into the rising pipe for increasing the amount of gas which creates the suction.

6. The method of claim 1, further comprising separating the settled sludge from the ascending gas, and adding oxygen to the ascending gas in an amount of 1 to 3% by volume to achieve a biological oxidation of sulfur contained in the ascending gas.

7. The method of claim 1, further comprising separating the ascending gas from the settled sludge and supplying purified waste water to the seed sludge.

8. The method of claim 1, wherein the temperature of the waste water is between 10° C. and 20° C.

9. A device for purifying waste water, comprising a container, a waste water inlet, an outlet for purified water, at least one gas collector arranged in the container, a gas separating means provided in the gas collector, a rising pipe connected to the gas collector and having an opening in a settled sludge zone in the container, wherein the gas separating means is formed by a substantially inversely U-shaped bend of a pipe connecting the rising pipe and the gas collector.

10. The device of claim 9, wherein the rising pipe terminates in a gas-sludge separating means from which a downpipe leads from the gas-sludge separating means back into the container below the gas collector.

11. The device of claim 10, further comprising a pipeline extending from the lower portion of the gas collector and terminating in the downpipe.

12. The device of claim 11, wherein the container comprises a first system of a plurality of the gas collectors which are provided with the pipes having a U-shaped bend, and a second system of a plurality of the gas collectors above the first system.

13. The device of claim 12, wherein said pipeline is provided between the gas collectors of the second system and the downpipe.

14. The device of claim 10, wherein a water pipe is connected to the downpipe via the gas-sludge separating means.

15. The device of claim 9, further comprising a gas line returning gas from the gas-sludge separating means to the rising pipe.

16. The device of claim 9, wherein the device comprises a plurality of gas collectors.

17. A device for purifying waste water, comprising a container, a waste water inlet, an outlet for purified water, at least one gas collector arranged in the container, and a rising pipe connected to the gas collector and having an opening in a settled sludge zone in the container, wherein the rising pipe terminates in a gas-sludge separating means and a pipe which delivers purified waste water terminates in me gas-sludge separating means.

* * * * *

UNITED STATES PATENT AND TRADEMARK OFFICE
CERTIFICATE OF CORRECTION

PATENT NO.   : 6,478,963 B1                                        Page 1 of 1
DATED        : November 12, 2002
INVENTOR(S)  : Peter Rossmanith It is certified that error appears in the above-identified patent and that said Letters Patent is hereby corrected as shown below:

Title page,
Item [57], ABSTRACT,
Line 12, please change "waster water" to -- waste water --.

Column 4,
Line 65, please change "rinsing" to -- rising --.

Column 5,
Line 24, please change "seed" to -- settled --.
Line 26, please change "20°" to -- 37° --.

Column 6,
Line 32, please change "in me" to -- in the --.

Signed and Sealed this

Eighteenth Day of March, 2003

JAMES E. ROGAN
*Director of the United States Patent and Trademark Office*